(12) United States Patent
Zhang et al.

(10) Patent No.: US 8,435,018 B2
(45) Date of Patent: May 7, 2013

(54) COOLING FAN

(75) Inventors: Yong-Kang Zhang, Shenzhen (CN);
Zhi-Ya Yang, Shenzhen (CN);
Ying-Liang Li, Shenzhen (CN)

(73) Assignees: Fu Zhun Precision Industry (Shen Zhen) Co., Ltd., Shenzhen (CN);
Foxconn Technology Co., Ltd., New Taipei (TW)

( * ) Notice: Subject to any disclaimer, the term of this patent is extended or adjusted under 35 U.S.C. 154(b) by 42 days.

(21) Appl. No.: 13/329,329

(22) Filed: Dec. 19, 2011

(65) Prior Publication Data

US 2012/0087816 A1    Apr. 12, 2012

Related U.S. Application Data

(62) Division of application No. 12/056,297, filed on Mar. 27, 2008, now Pat. No. 8,100,673.

(30) Foreign Application Priority Data

Feb. 29, 2008    (CN) .......................... 2008 1 0065464

(51) Int. Cl.
*F04B 35/04*    (2006.01)
(52) U.S. Cl.
USPC ................. 417/423.13; 417/423.12; 384/279; 384/517; 384/902
(58) Field of Classification Search ............ 417/423.12, 417/423.13, 354; 384/279, 322, 397, 408, 384/415, 517, 518, 902
See application file for complete search history.

(56) References Cited

U.S. PATENT DOCUMENTS

| 4,200,341 | A  | * | 4/1980 | Kauschke | ........................ 384/15 |
| 6,050,786 | A  | * | 4/2000 | Lin | ................. 417/366 |
| 6,102,675 | A  | * | 8/2000 | Hsieh | ........................ 417/423.13 |
| 6,183,221 | B1 | * | 2/2001 | Hsieh | ........................ 417/423.12 |
| 6,246,140 | B1 | * | 6/2001 | Horng | ............................ 310/91 |
| 6,309,191 | B1 | * | 10/2001 | Hu | ............................ 417/423.12 |
| 6,318,976 | B1 | * | 11/2001 | Hsieh | ........................ 417/423.12 |
| 6,567,268 | B1 | * | 5/2003 | Hsieh | ............................ 361/695 |
| 6,692,152 | B2 | * | 2/2004 | Shingai et al. | ................. 384/100 |
| 6,832,853 | B2 | * | 12/2004 | Fujinaka | ........................ 384/100 |
| 6,836,041 | B2 | * | 12/2004 | Chou et al. | ........................ 310/90 |
| 8,207,643 | B2 | * | 6/2012 | Horng et al. | ........................ 310/90 |
| 2002/0172609 | A1 | * | 11/2002 | Hsieh | ........................ 417/423.7 |
| 2002/0192087 | A1 | * | 12/2002 | Hsieh | ........................ 417/354 |
| 2003/0143086 | A1 | * | 7/2003 | Shih et al. | ........................ 417/354 |
| 2003/0231968 | A1 | * | 12/2003 | Hsieh | ........................ 417/353 |
| 2004/0136842 | A1 | * | 7/2004 | Obara et al. | ........................ 417/354 |
| 2004/0228559 | A1 | * | 11/2004 | Horng et al. | ........................ 384/517 |
| 2005/0147511 | A1 | * | 7/2005 | Hsu et al. | ........................ 417/423.12 |

(Continued)

*Primary Examiner* — Charles Freay
*Assistant Examiner* — Ryan Gatzemeyer
(74) *Attorney, Agent, or Firm* — Altis Law Group, Inc.

(57) ABSTRACT

A cooling fan (1) includes a fan housing (10), a stator (20), a rotor (30) and a bearing assembly (40). A tube (111) extends upwardly from a central portion of the fan housing. The stator is mounted around the tube. The bearing assembly includes a ball bearing (333) and a sleeve bearing (335) received in two ends of the tube, respectively. The rotor has a shaft (336) extending into and rotatably supported by the bearing assembly. An elastic element (332) is arranged on the ball bearing to provide a pressing force on the ball bearing toward the sleeve bearing. An oil retaining element (339) is arranged around a bottom end of the shaft and spaced from the shaft. The oil retaining element is attached to the sleeve bearing to provide oil for the sleeve bearing.

5 Claims, 4 Drawing Sheets

U.S. PATENT DOCUMENTS

| | | | |
|---|---|---|---|
| 2005/0200216 A1* | 9/2005 | Brown | 310/90 |
| 2007/0273229 A1* | 11/2007 | Lan et al. | 310/90 |
| 2008/0007127 A1* | 1/2008 | Hong et al. | 310/51 |
| 2008/0008590 A1* | 1/2008 | Yeh et al. | 416/174 |
| 2008/0267793 A1* | 10/2008 | Yang et al. | 417/354 |
| 2008/0298983 A1* | 12/2008 | Tsai et al. | 417/354 |
| 2009/0047148 A1* | 2/2009 | Chen et al. | 417/354 |
| 2009/0087129 A1* | 4/2009 | Horng et al. | 384/322 |
| 2011/0097221 A1* | 4/2011 | Horng | 417/354 |

\* cited by examiner

US 8,435,018 B2

COOLING FAN

CROSS-REFERENCE TO RELATED APPLICATIONS

This application is a divisional application of prior-filed U.S. patent application Ser. No. 12/056,297 field Mar. 27, 2008, which is based on and claims priority from CN Patent Application No. 200810065464.5 filed Feb. 29, 2008.

BACKGROUND

1. Technical Field

The present invention relates to a cooling fan, and more particularly relates to a cooling fan having an improved bearing assembly.

2. Description of Related Art

With the continuing development of the electronic technology, electronic packages such as CPUs (central processing units) are generating more and more heat that requires immediate dissipation. Cooling fans are commonly used in combination with heat sinks for cooling CPUs.

Oftentimes, a cooling fan includes a blade set and a fan seat. The fan seat has a central tube portion integrally formed thereon. A sleeve bearing is arranged in the tube portion. A coil is wound around the outside of the tube portion. The blade set is formed with a hub and fan blades connecting to the hub. A stainless steel rotary shaft supported by the sleeve bearing is arranged within the hub. A magnet pushed by magnetic force of the coil is fixed to the hub and is driven to rotate by the coil so that the fan blades can produce forced airflow. Since the aforesaid stainless steel rotary shaft is arranged to rotatably engage in the sleeve bearing, after rotating for a period of time, the rotary shaft and the bearing will experience wear due to leaking of lubricating oil contained therebetween. Thus, the lifetime of the fan will be reduced.

In order to improve the lifetime of the fan, wear-tolerable ball bearings for point contact have been developed. Each ball bearing has an inner ring, an outer ring and a plurality of balls. The inner ring is mounted on the rotary shaft. The outer ring is connected to the tube portion. The balls are disposed between the inner ring and the outer rings. During operation, the inner ring rotates with the rotary shaft with the support of the balls. In order to make the ball bearing run more smoothly, manufacturing process for the ball bearings requires precision-grinding and a high polish, and thus the ball bearings are more expensive, which results in a high cost.

For the foregoing reasons, therefore, there is a need in the art for a cooling fan which overcomes the above-mentioned problems.

BRIEF DESCRIPTION OF THE DRAWINGS

Many aspects of the present cooling fan can be better understood with reference to the following drawings. The components in the drawings are not necessarily drawn to scale, the emphasis instead being placed upon clearly illustrating the principles of the present cooling fan. Moreover, in the drawings, like reference numerals designate corresponding parts throughout the several views.

DETAILED DESCRIPTION

Figure 1:
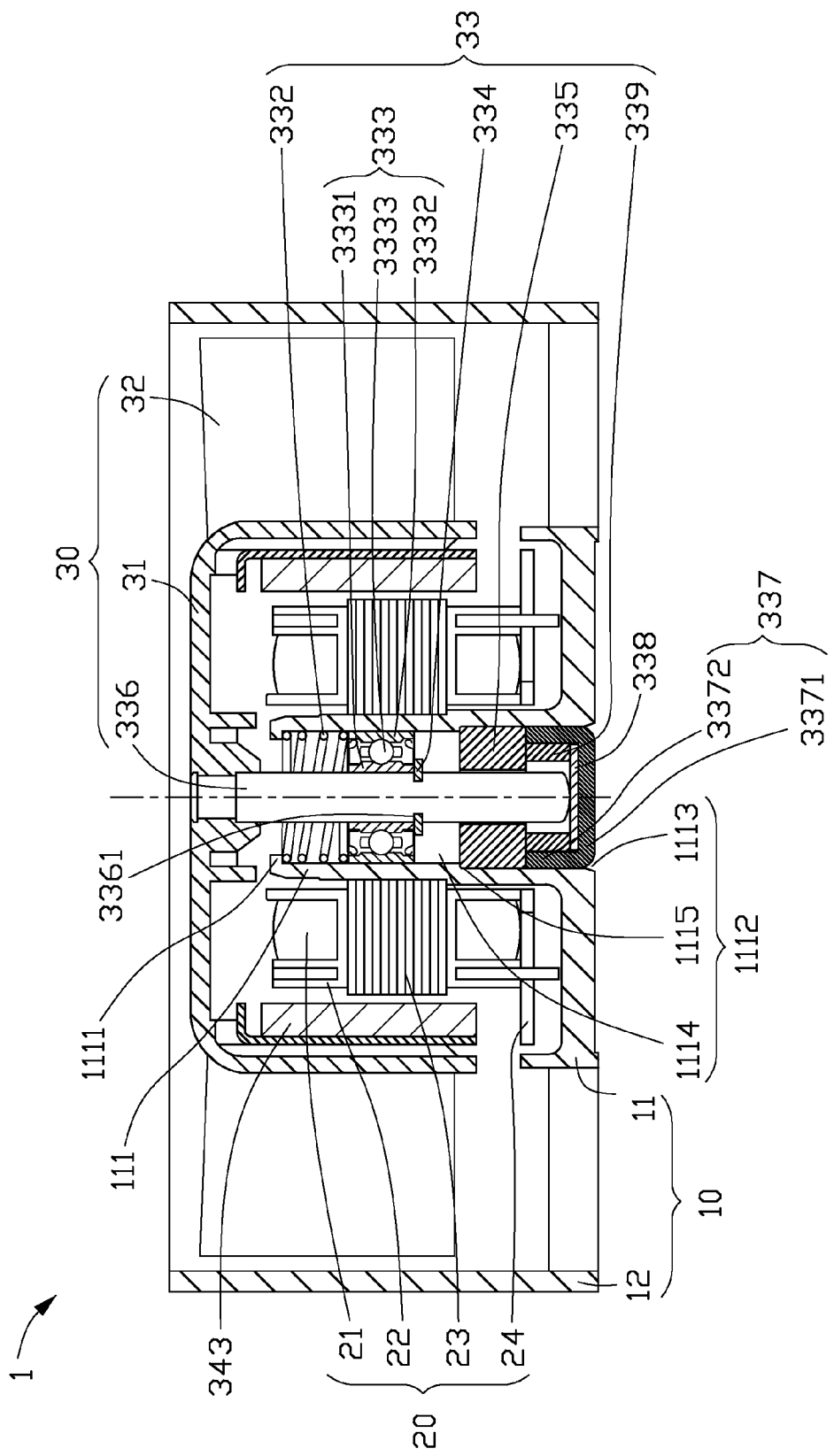
FIG. 1 is an assembled, cross-sectional view of a cooling fan in accordance with a preferred embodiment of the present invention.

Referring to FIG. 1, a cooling fan 1 according to a preferred embodiment includes a fan housing 10, a stator 20, a rotor 30, and a bearing assembly 33.

The fan housing 10 includes a base 11 and a sidewall 12 surrounding the base 11. An inner space (not labeled) is defined between the base 11 and the sidewall 12 for receiving the rotor 30 and the stator 20 therein. A central tube 111 extends upwardly from a central portion of the base 11. The central tube 111 defines a through hole 1112 therein. The through hole 1112 includes an upper portion 1114 and a lower portion 1113. The upper portion 1114 has a diameter being smaller than that of the lower portion 1113. A step 1115 is thus formed between the upper and lower portions 1114, 1113. A cover 337 couples to a bottom end of the central tube 111 to seal the bottom end of the central tube 111. The cover 337 has a substrate 3371 and a cylinder 3372 extending upwardly from an outer periphery of the substrate 3371. The cylinder 3372 has an outer diameter slightly larger than the diameter of the lower portion 1113 of the through hole 1112 of the central tube 111. When assembled, the cylinder 3372 of the cover 337 is interferentially fitted into the lower portion 1113 of the through hole 1112, and abuts against the inner circumference of the bottom end of the central tube 111. An annular flange 1111 extends radially and inwardly from an inner circumference of a top end of the central tube 111.

The stator 20 is mounted around the central tube 111. The stator 20 includes a stator core 23 consisting of layered yokes, and stator coils 21 surrounding the stator core 23 to establish an alternating magnetic field. A PCB 24 (printed circuit board) with electronic components mounted thereon is electrically connected with the stator coils 21 to control electrical current flowing through the coils 21. To avoid the coils 21 from coming into electrical contact with the stator core 23, upper and lower insulating frames 22 are used to cover the stator core 23 and electrically insulate the stator coils 21 from the stator core 23.

The rotor 30 includes a hub 31 forming a shaft seat (not labeled) in a central portion thereof, a plurality of fan blades 32 extending radially from an outer periphery of the hub 31, a permanent magnet 343 adhered to an inner side of the hub 31, and a shaft 336 received in the shaft seat and extending downwardly from a central portion of the shaft seat. An annular notch 3361 is defined in an outer circumference of a middle portion of the shaft 336. A locking plate 334 is mounted around the shaft 336 and engaged into the notch 3361 of the shaft 336.

The bearing assembly 33 includes a ball bearing 333 and a sleeve bearing 335. Both of the bearings 333, 335 are mounted around the shaft 336 to support rotation of the shaft 336. The ball bearing 333 is received in the upper portion 1114 of the through hole 1112 and just located on the locking plate 334. Alternatively, the locking plate 334 can be an outward protrusion from the shaft 336 or an inward projecting part of the central tube 111, which can position the ball bearing 333 at the desired position. The ball bearing 333 includes an inner ring 3331, an outer ring 3332 and a plurality of balls 3333 sandwiched between the inner and outer rings 3331, 3332. The inner ring 3331 has an inner diameter substantially the same as the diameter of the shaft 336 and thus the inner ring 3331 is fixedly mounted around the shaft 336 to rotate with the shaft 336. The outer ring 3332 has an outer diameter slightly larger than the diameter of the upper portion 1114 of the through hole 1112 and is interferentially fitted in the central tube 111. Thus, the outer ring 3332 is stationary during operation of the cooling fan 1. An inner diameter of the outer ring 3332 is larger than that of the locking plate 334. A top end of the ball bearing 333 is lower than the top end of the central tube 111, and thus a space is defined between the top end of the ball bearing 333 and the top end of the central tube 111 to accommodate an elastic element 332. In this embodiment, the elastic element 332 is a helical spring. Alternatively, a flexible sleeve made of elastomer can be adopted to replace the helical spring. A top end of the spring abuts against the flange 1111 of the central tube 111, and a bottom end of the spring abuts against the outer ring 3332 of the ball bearing 333 to provide a pressing force on the ball bearing 333 toward the sleeve baring 335. If the shaft 336 rotates and moves upwardly along an axial direction thereof, the ball bearing 333 accordingly moves toward the elastic element 332 to compress the elastic element 332 with the inner flange 1111. The ball bearing 333 is at the same time subject to downward pushing force generated by the compressed elastic element 332. Thus, the problem of upward floating of the rotor 30 during the initial operation of the cooling fan 1 can be lessened.

The sleeve bearing 335 is arranged in the lower portion 1113 of the through hole 1112 of the central tube 111. The sleeve bearing 335 has an outer diameter slightly larger than the diameter of the lower portion 1113 and is interferentially fitted in the central tube 111. Thus, the sleeve bearing 335 is stationary during operation of the cooling fan 1. An inner diameter of the sleeve bearing 335 is a little larger than the diameter of the shaft 336 and thus a clearance (not labeled) is formed between the shaft 336 and the sleeve bearing 335. A height of the sleeve bearing 335 is the same as a distance between the cover 337 and the step 1115 of the central tube 111. A top end of the sleeve bearing 335 abuts the step 1115, and a bottom end of the sleeve bearing 335 abuts a top end of the cylinder 3372 of the cover 337. An annular oil retaining element 339 is arranged in the bottom end of the central tube 111. The oil retaining element 339 is made of sponge or felt. An outer diameter of the oil retaining element 339 is approximately the same as an inner diameter of the cylinder 3372 of the cover 337, and an inner diameter of the oil retaining element 339 is larger than the diameter of the shaft 336. When assembled, the shaft 336 extends through the bearing assembly 33 and the oil retaining element 339. A wear pad 338 made of highly abrasion-resistant material is arranged on the substrate 3371 of the cover 337 and supportively engages with a bottom end of the shaft 336.

During operation, the rotor 30 is driven to rotate by the interaction of the alternating magnetic field established by the stator 20 and the magnetic field of the magnet 343 of the rotor 30. The oil stored in the oil retaining element 339, under the influence of the centrifugal force generated by the rotation of the shaft 336, creeps up along the shaft 336 through the clearance between the sleeve bearing 335 and the shaft 336 to reduce friction therebetween. Due to the oil retaining element 339 arranged under the sleeve bearing 335, the amount of lubricant oil which can flow through the clearance is significantly increased and thus good lubrication of the rotary shaft 336 and the sleeve bearing 335 of the present invention is constantly maintained, thereby improving the quality and life-span of the cooling fan 1. On the other hand, the two bearings 333, 335 are respectively fixed in place and thus are spaced from each other; the lubricating oil of the sleeve bearing 335 cannot flow into the ball bearing 333 and thus interference between the two bearings 333, 335 is avoided. Use of the ball bearing 333 thus gives a longer operational lifespan to the cooling fan 1. The sleeve bearing 335 can reduce the cost of the cooling fan 1 as it is cheaper. Thus due to the support of the ball bearing 333 and the sleeve bearing 335 arranged on the top and bottom ends of the shaft 336, rotation of the shaft 336 is smooth and stable. The bearing assembly 33 of one ball bearing 333 and one sleeve bearing 335 can achieve a relatively low cost and a relatively high performance at the same time, thus improving the life-span of the cooling fan 1 and reducing the cost of the cooling fan 1.

Figure 2:
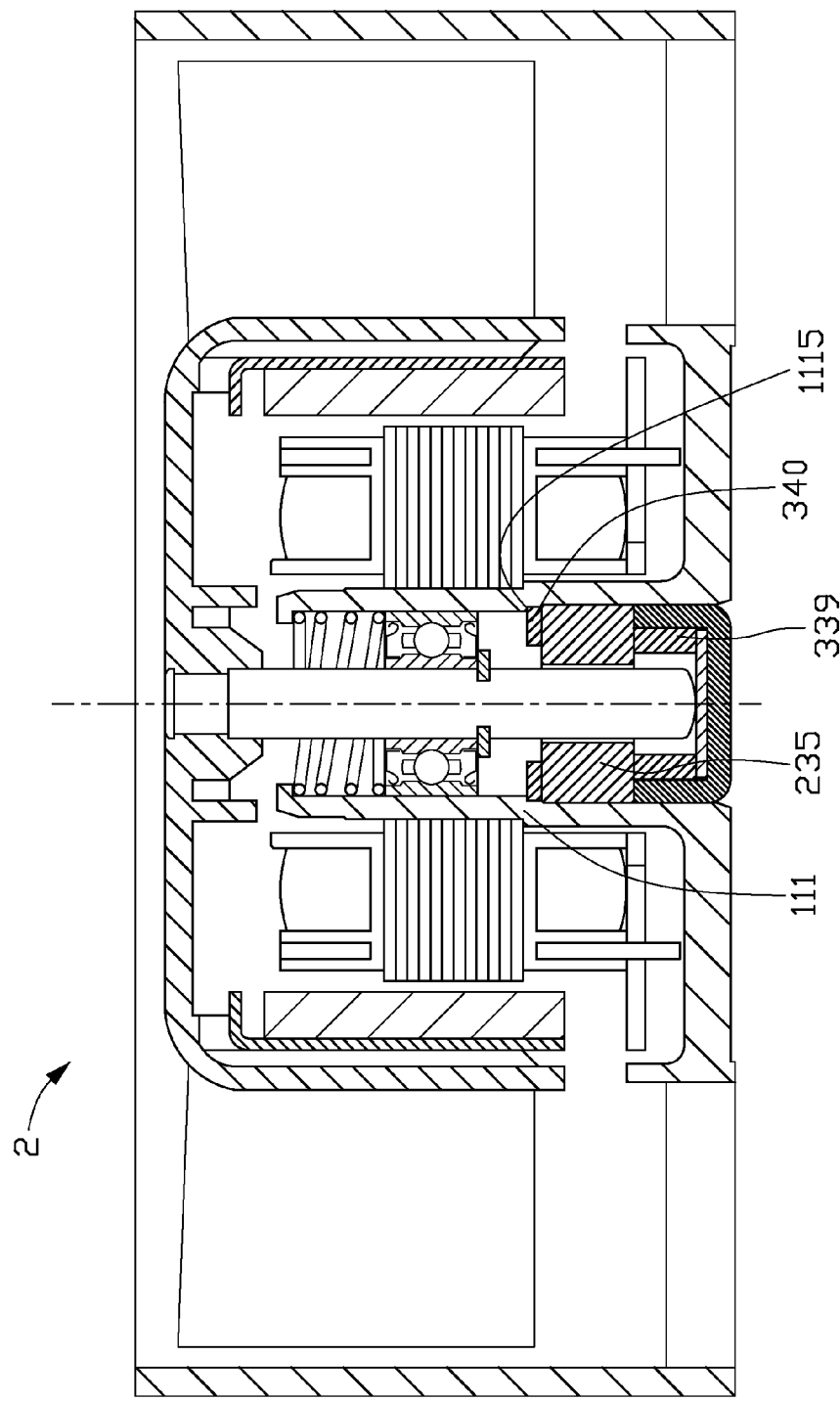
FIG. 2 is similar to FIG. 1, but shows an alternative embodiment of the cooling fan.

FIG. 2 shows a cooling fan 2 according to a second embodiment of the present invention. The difference between the second embodiment and the first embodiment is that the cooling fan 2 further includes a second oil retaining element 340. The second oil retaining element 340 is ring-shaped and thin. The top end of the sleeve bearing 235 is lower than the step 1115 of the central tube 111. The second oil retaining element 340 is sandwiched between the top end of the sleeve bearing 235 and the step 1115.

Figure 3:
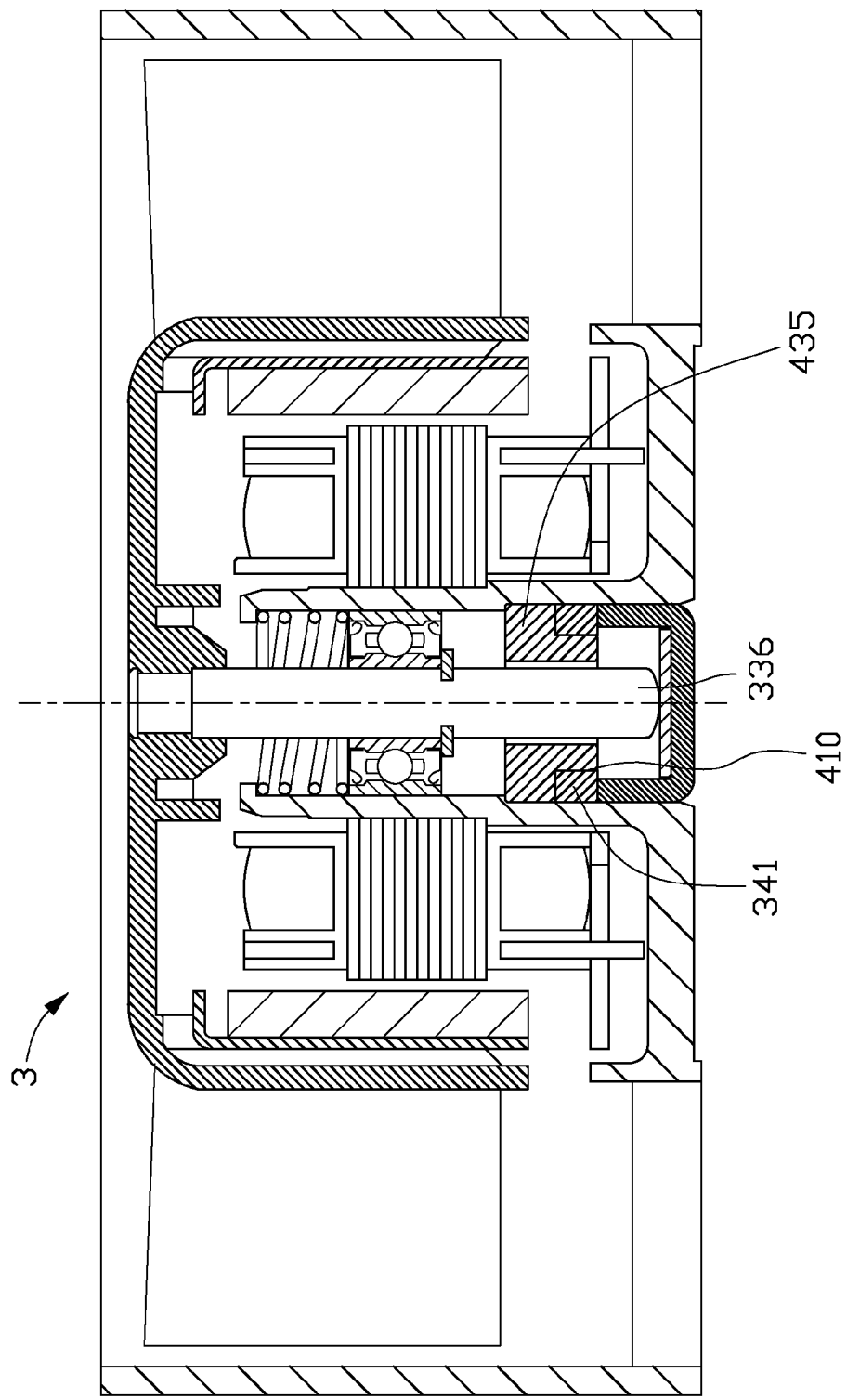
FIG. 3 shows a third embodiment of the cooling fan according to the present invention.

Referring to FIG. 3, a cooling fan 3 according to a third embodiment of the present invention is shown. The difference between the third embodiment and the first embodiment is that an annular groove 410 is defined in an outer circumference of the bottom end of the sleeve bearing 435. The oil retaining element 341 has a size being approximately the same as the groove 410 and is received in the groove 410.

Figure 4:
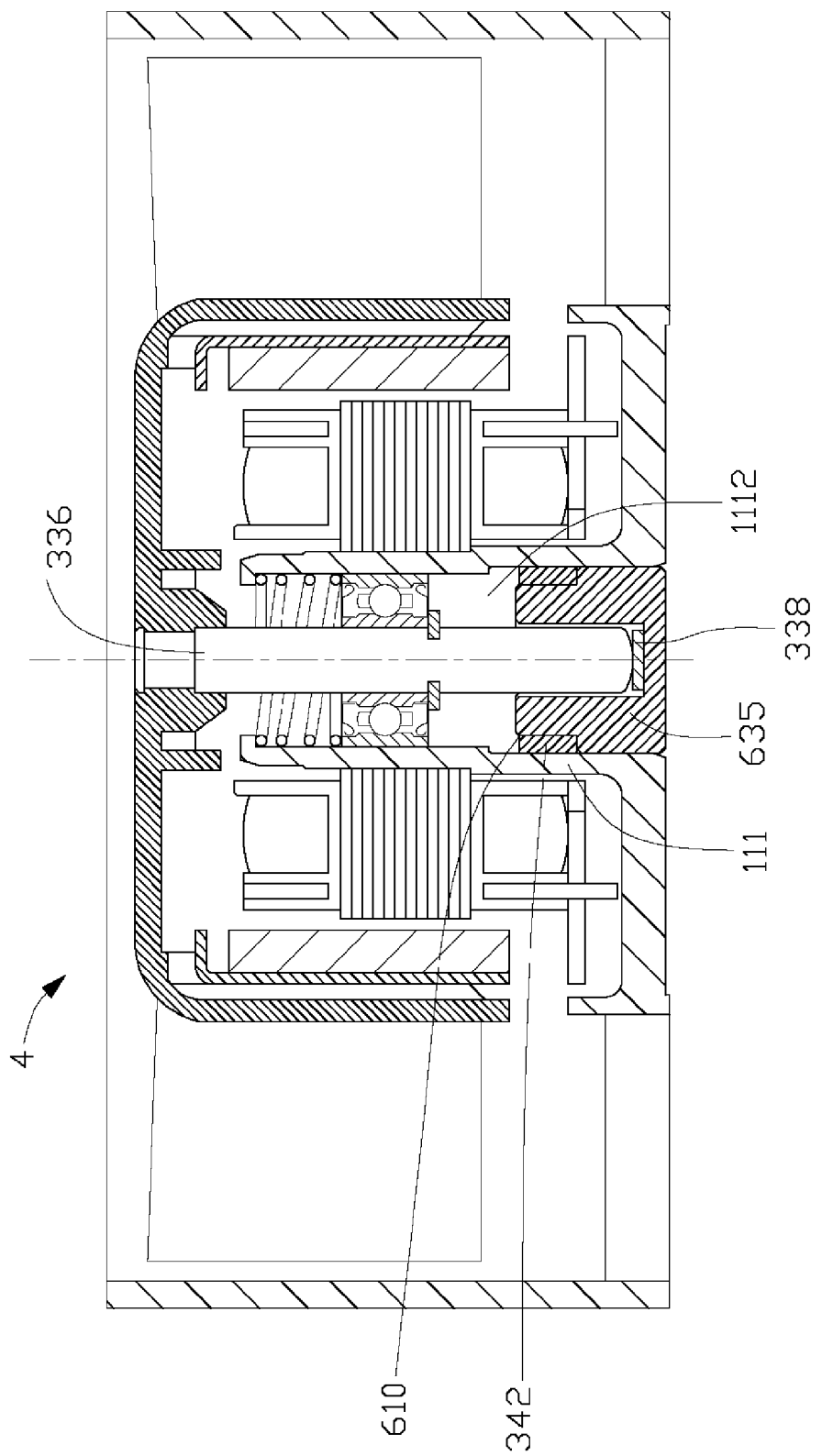
FIG. 4 is a cross-sectional view of the cooling fan according to a forth embodiment of the present invention.

FIG. 4 illustrates a cooling 4 fan according to a fourth embodiment of the present invention. The difference between the fourth embodiment and the first embodiment is that the sleeve bearing 635 has an open top end and a closed bottom end. When assembled, the sleeve bearing 635 is arranged in the bottom end of the central tube 111 to seal the bottom of the through hole 1112. The wear pad 338 is arranged in the sleeve bearing 635, and the bottom end of the shaft 336 extends into the sleeve bearing 635 and engages with the wear pad 338. A groove 610 is defined in the outer circumference of the top end of the sleeve bearing 635 and receives the oil retaining element 342 therein.

It is understood that the invention may be embodied in other forms without departing from the spirit thereof. Thus, the present example and embodiment are to be considered in all respects as illustrative and not restrictive, and the invention is not to be limited to the details given herein.

What is claimed is:
1. A cooling fan, comprising:
 a tube with a through hole defined therein and extending along an axial direction thereof, the through hole comprising an upper portion and a lower portion with a diameter larger than that of the upper portion, a step being formed between the upper portion and the lower portion;
 a stator mounted around the tube;
 a bearing assembly comprising a ball bearing received in the upper portion of the tube and a sleeve bearing received in the lower portion of the tube, an elastic element arranged adjacent to the ball bearing to provide a pressing force on the ball bearing, and an oil retaining element arranged adjacent to the sleeve bearing to provide oil for the sleeve bearing;
 a rotor having a shaft extending into and rotatably supported by the bearing assembly; and
 a cover coupled to a bottom end of the tube to seal the bottom end of the tube, the sleeve bearing being sandwiched between the step and the cover;
 wherein the oil retaining element is arranged in the cover, a top end of the oil retaining element abutting a bottom end of the sleeve bearing, an inner diameter of the oil retaining element being larger than a diameter of the shaft, and a bottom end of the shaft extending into the oil retaining element.

2. The cooling fan of claim 1, wherein the oil retaining element is made of one of sponge and felt.

3. The cooling fan of claim 1, wherein an annular flange extends radially and inwardly from a top end of the tube, and a locking plate is engaged with a middle of the shaft, the ball bearing being arranged on the locking plate, a top end of the ball bearing abutting a bottom end of the elastic element, and a top end of the elastic element abutting the flange of the tube.

4. A cooling fan, comprising:
- a tube with a through hole defined therein and extending along an axial direction thereof, the through hole comprising an upper portion and a lower portion with a diameter larger than that of the upper portion, a step being formed between the upper portion and the lower portion;
- a stator mounted around the tube;
- a bearing assembly comprising a ball bearing received in the upper portion of the tube and a sleeve bearing received in the lower portion of the tube, an elastic element arranged adjacent to the ball bearing to provide a pressing force on the ball bearing, and an oil retaining element arranged adjacent to the sleeve bearing to provide oil for the sleeve bearing;
- a rotor having a shaft extending into and rotatably supported by the bearing assembly; and
- a cover coupled to a bottom end of the tube to seal the bottom end of the tube, the sleeve bearing being sandwiched between the step and the cover;

wherein a groove is defined in an outer circumference of a bottom end of the sleeve bearing, and the oil retaining element is received in the groove.

5. A cooling fan, comprising:
- a tube with a through hole defined therein and extending along an axial direction thereof, the through hole comprising an upper portion and a lower portion with a diameter larger than that of the upper portion, a step being formed between the upper portion and the lower portion;
- a stator mounted around the tube;
- a bearing assembly comprising a ball bearing received in the upper portion of the tube and a sleeve bearing received in the lower portion of the tube, an elastic element arranged adjacent to the ball bearing to provide a pressing force on the ball bearing, an oil retaining element arranged adjacent to the sleeve bearing to provide oil for the sleeve bearing, and a second oil retaining element arranged between a top end of the sleeve bearing and the step of the tube; and
- a rotor having a shaft extending into and rotatably supported by the bearing assembly.

* * * * *